US006945327B2

(12) United States Patent
Ely et al.

(10) Patent No.: US 6,945,327 B2
(45) Date of Patent: Sep. 20, 2005

(54) METHOD FOR REDUCING PERMEABILITY RESTRICTION NEAR WELLBORE

(75) Inventors: John W. Ely, Houston, TX (US); Bradley C. Wolters, College Station, TX (US); William D. McCain, College Station, TX (US)

(73) Assignee: Ely & Associates, Inc., Houston, TX (US)

( * ) Notice: Subject to any disclaimer, the term of this patent is extended or adjusted under 35 U.S.C. 154(b) by 331 days.

(21) Appl. No.: 10/364,717

(22) Filed: Feb. 11, 2003

(65) Prior Publication Data

US 2004/0157749 A1 Aug. 12, 2004

(51) Int. Cl.[7] .......................... E21B 43/12; E21B 43/26

(52) U.S. Cl. ............... 166/263; 166/250.01; 166/305.1; 166/308.1; 166/371; 507/202; 507/266

(58) Field of Search ............................ 166/250.01, 263, 166/305.1, 308.1, 371, 400, 402, 403; 507/202, 240, 244, 248, 266

(56) References Cited

U.S. PATENT DOCUMENTS 2,324,172 A * 7/1943 Parkhurst .................... 166/266
2,767,791 A * 10/1956 Dominicu ................... 166/266
2,908,641 A * 10/1959 Boyle ...................... 166/305.1
3,098,038 A * 7/1963 Hibbs et al. ............. 166/308.4
3,149,668 A * 9/1964 Arendt ....................... 166/266
3,301,328 A * 1/1967 Campion ................. 166/305.1
3,498,378 A * 3/1970 Graham et al. ............. 166/263
4,548,267 A * 10/1985 Sheffield et al. ............ 166/268
4,635,721 A * 1/1987 Sheffield et al. ............ 166/268
4,765,407 A * 8/1988 Yuvancic .................... 166/268
5,042,580 A * 8/1991 Cullick et al. ........... 166/252.1
6,767,869 B2 * 7/2004 DiLullo et al. ............. 507/244

OTHER PUBLICATIONS

"Wellbore Liquid Blockage in Gas–Condensate Reservoirs", SPE 51050, 1998.

"Condensate Banking Dynamics in Gas Condensate Fields: Compositional Changes and Condensate Accumulation Around Production Wells", SPE 62930, 2000.

* cited by examiner

*Primary Examiner*—George Suchfield
(74) *Attorney, Agent, or Firm*—Claude E. Cooke, Jr.

(57) ABSTRACT

Method is provided for increasing the productivity of gas wells producing from reservoirs where retrograde condensation occurs around the wells. An oil-wetting surfactant is injected in a solvent to oil wet the formation for a selected distance around a well or a hydraulic fracture intersecting the well. A pre-flush liquid, such as carbon dioxide, alcohol or similar products and mixtures thereof, may be used to reduce water saturation before injection of the surfactant. The method may also be applied to increase the productivity of oil wells producing from reservoirs where breakout of solution gas occurs near the well.

13 Claims, 1 Drawing Sheet

METHOD FOR REDUCING PERMEABILITY RESTRICTION NEAR WELLBORE

FIELD OF THE INVENTION

This invention relates to the enhancement of hydrocarbon recovery from subsurface formations. More particularly, a method for reducing permeability restrictions in a near-wellbore region using surfactants to enhance the effective permeability of the formation to a hydrocarbon is provided.

BACKGROUND OF THE INVENTION

Natural gas usually contains a mixture of methane and heavier hydrocarbons, such as ethane, propane, butane and medium- to long-chain hydrocarbons. As long as pressures within the reservoir remain high around production wells, the hydrocarbons can be economically produced in a gas phase. However, when pressure within the reservoir and around production wells decreases as hydrocarbon is produced, a phenomenon commonly known as retrograde condensation occurs. The heavier hydrocarbons condense to a liquid phase. The presence of liquid hydrocarbons in the formation rock around a production well causes significant reductions in the effective permeability to gas in the near-wellbore region.

The gas pressure near a wellbore may decrease below the dewpoint pressure of the natural gas while the pressure within most of the reservoir remains higher than the dewpoint pressure. Moreover, the condensed hydrocarbon liquid accumulates into a condensate bank near the wellbore that dramatically reduces the effective permeability of the reservoir to gas and, thus, significantly impairs the recovery rate of hydrocarbons. As a result, the formation of retrograde condensate can effectively prevent the economic production of vast volumes of natural gas.

In addition, the presence within the formation of liquid water greatly exacerbates this problem. Liquid water combined with retrograde condensate formation introduces a third phase to the reservoir, whereby the multiphase effects further reduce the effective permeability of the reservoir to gas. Therefore, the recovery of hydrocarbons is further impaired.

Several methods have been used in an attempt to reduce the problems caused by retrograde condensate formation. One such method attempts to reduce the condensate saturation by utilization of a condensate removal agent. For example, large volumes of carbon dioxide and methanol, natural gas, or other suitable condensate removal agents are injected into the near-wellbore region to remove the condensed hydrocarbons that have accumulated due to the decrease in pressure. Studies have shown that this technique, sometimes referred to as the "Huff 'n' Puff" injection process, can reduce condensate buildup near the wellbore. ("Wellbore Liquid Blockage in Gas-Condensate Reservoirs", SPE 51050, 1998). However, these processes generally result in merely a temporary reduction of the condensate saturation subsequently followed by the rapid re-formation of the condensate, and a corresponding reduction in the effective permeability of the reservoir to gas. As a result, this technique is not an effective method to reduce the problems caused by retrograde condensate formation.

Another method attempts to reduce retrograde condensate formation through the injection of various water-wetting surfactants or non-wetting surfactants into the subsurface formation. These techniques have been shown to have minimal if any effect on near-wellbore production capacity.

The inventors believe that this failure is due to omission of the effects of the third phase. The combination of retrograde condensate with its inherent viscosity combined with movable water negates any positive effects from the surfactants. Consequently, the rapid reformation of condensate near the wellbore results in a rapid reduction in the effective permeability of the reservoir to gas.

Moderate success has been achieved in reducing retrograde condensate formation by the use of pressure maintenance in a reservoir. In general, pressure maintenance systems attempt to maintain the reservoir pressure above the dew point pressure of the gas by the re-injection of lean natural gas into the well. For example, a gas re-injection process has been utilized with some success in the Ekofisk project in the North Sea. However, the exorbitant costs associated with a typical gas re-injection scheme minimize the large-scale application of pressure maintenance systems. Moreover, most pressure maintenance systems are also not effective solutions because of compatibility problems or contamination of the in-situ gas by the injected gas. Even if pressure maintenance is applied to a reservoir, the drawdown in pressure near production wells may cause severe reduction in gas permeability and decreases in well productivity.

During production of crude oil from some reservoirs, the flowing bottomhole pressure in the reservoir is reduced such that the pressure of the crude oil in the reservoir rock around a well falls to below the bubblepoint pressure of the crude oil. This means that a gas phase forms in the rock around the well, and this gas-phase formation will cause a reduction in flow rate of crude oil into the well.

Consequently, there is a need for a process that can effectively reduce permeability restrictions near the wellbore caused by retrograde condensate or gas breakout from crude oil that allows for the effective and economically feasible recovery of hydrocarbons.

SUMMARY OF THE INVENTION

Figure 1:
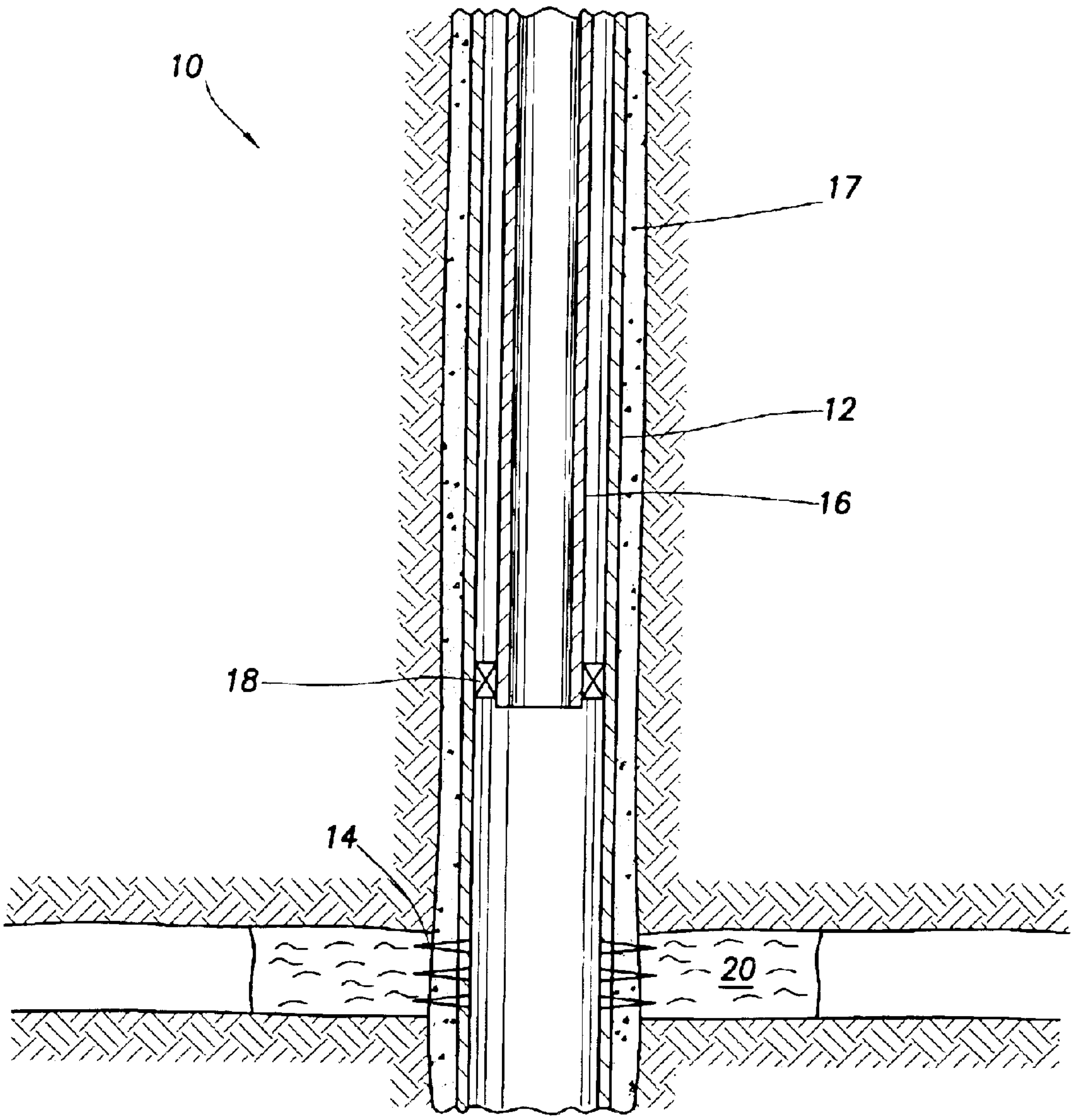
FIG. 1 illustrates a typical well for the recovery of hydrocarbons from an underground reservoir.

In one embodiment, the process of this invention includes a series of steps to effectively reduce permeability restrictions near the wellbore caused by retrograde condensate formation. The problem of retrograde condensate formation is greatly exacerbated by the presence of liquid water, which naturally occurs in the formation. These steps focus on increasing the permeability of the formation to gas by effectively removing liquid water from the formation and further preventing the re-saturation of such water. Specifically, the re-saturation of water is prevented by the injection of surfactants that cause the underground reservoir to achieve an oil-wet state for a selected distance around a production well. By the elimination of water from the reservoir within this distance and minimization of water re-saturation, the formation's effective permeability to gas is thereby increased. In another embodiment, the process is applied in and around an oil well producing at a bottomhole pressure below the bubblepoint pressure of the oil.

The process components, implemented in a sequential manner, may consist of the following:

a) laboratory tests on specific formation cores or other porous media to select a surfactant and a preferable range of concentrations in a solvent, at selected water saturations in the cores;

b) use of a known mathematical model to predict propagation of the surfactant through the formation;

c) injection of a dehydrating pre-flush into the near-wellbore region of a well to be treated;

d) injection of a surfactant flush into the near-wellbore region of the well;

e) injection of a post-flush mixture containing light hydrocarbons into the near-wellbore region of the well;

f) closure of well, if necessary, to achieve equilibrium between the injected surfactant and the formation; and g) resumption of production of hydrocarbons from the well.

Various steps in the above list may be omitted for some wells. For example, use of a dehydrating pre-flush may not be required, dependent on the characteristics of the surfactant used in the surfactant flush. In addition, dependent upon the desired penetration of the formation, multiple stages of the surfactant flush may be used. Varying degrees of penetration of the near-wellbore region may be accomplished by varying the molecular weights or the side chains of the surfactants and/or the solubility of the surfactant in the solvent.

These steps may also be applied in an oil well producing crude oil at a pressure below the bubblepoint of the crude oil.

DESCRIPTION OF PREFERRED EMBODIMENTS

During the production of hydrocarbons from underground reservoirs, the phenomena known as retrograde condensate formation severely decreases the ability to effectively and economically recover hydrocarbons from the well. The method of the present invention may be applied to restore the effective and economic recovery of hydrocarbons in areas where retrograde condensation has reduced the in-situ permeability to gas of the near-wellbore region. The method may be applied in wells having radial flow into the wellbore or in wells that have been hydraulically fractured.

There are a large number of surfactants that can act to cause sandstone and carbonate (limestone) reservoirs to become oil-wet and accomplish the reduction of water saturation. As a result, the effective permeability of the formation to gas is increased. In particular, when injected into subsurface formations, ionically charged surfactants adsorb onto the walls of the pore spaces of the formation. Based upon characteristics of the formation, the adsorption of the ionically charged surfactants creates an oil-wet condition on such walls. This oil wet condition within the formation acts to decrease the tendency for spontaneous imbibition of water back into the treated rock and minimizes the re-saturation of the water into the treated volume. As a result, the harmful effects of retrograde condensate formation are reduced, and the effective permeability of the near-wellbore region to gas is increased.

Because the surfaces of sandstone formations are normally negatively charged, a cationic surfactant is preferably used to create an oil-wet condition within sandstone reservoirs. The list of suitable cationic surfactants includes, but is not limited to the following: primary amines, secondary amines, tertiary amines, diamines, quaternary ammonium salts, di-quaternary salts, ethoxylated quaternary salts, ethoxylated amines, ethoxylated diamines, amine acetates, and diamine diacetates. Similarly, because the surfaces of carbonate formations are normally positively charged, an anionic surfactant is preferably used to create an oil wet condition within carbonate reservoirs. The list of suitable anionic surfactants includes, but is not limited to the following: sulfonic acids and their salts, sulfates and ether sulfates, sulfonates, alpha-olefin sulfonates, ethoxylated carboxylates, sulfosuccinates, phosphate esters, alkyl naphthalene sulfonates, and napthalene sulfonate condensate. The classes of surfactants mentioned above and combinations thereof specifically selected, based upon characteristics of the formation, work very well in achieving an oil-wet condition on the surfaces of the pore spaces of the formation.

The surfactant and/or surfactant blend may be combined with a solvent to form the surfactant flush that will be injected into the near-wellbore region. Suitable solvents include, but are not limited to, alcohol and alcohol-water mixtures. Preferably, methanol is the alcohol used. The concentration of the surfactant and/or surfactant blends in the solvent can vary between 0.05% and 5.0% by volume and more preferably between 0.1% and 3.0% by volume. Even more preferable are concentrations of the surfactant and/or surfactant blend in the solvent of between 0.1% and 1.0%.

By varying the molecular weights and structures of the surfactants, varying degrees of dispersion of the surfactant within the reservoir (movement of the surfactant from an injection well into the reservoir) can be achieved. As the molecular weight of the surfactant decreases, the solubility of the surfactant in the solvent increases. As the solubility of the surfactant within the solvent increases, the surfactant can be transported to greater distances from the wellbore. Thus, selective molecular weights of surfactants will allow for placement of the surfactant at different distances from the wellbore. The same results may be achieved by using various concentrations of alcohol with water to obtain different solubilities of the surfactant in the solvent. Greater solubility of the surfactant causes greater dispersion of the surfactant from the injection well into the reservoir. Another technique, which can change the solubility of surfactants and thus control the placement of the surfactant, is to vary the structure of the surfactant by varying the chain length of the side chains of the surfactant.

To achieve varying degrees of wellbore penetration of oil-wetting surfactants from a well into the surrounding formation, the near-wellbore region may be treated with multiple surfactant flushes where each flush contains a different molecular weight surfactant and/or solubility of surfactant in the solvent. Preferably, to obtain a more uniform dispersion of the ionically charged surfactant, the molecular weight of the surfactant varies from a low molecular weight in the initial stage of treatment to a higher molecular weight in the last stage. Likewise, the varying degrees of wellbore penetration from the injection well may be obtained where the solubility of the surfactant in the solvent varies from very high in the initial stage of treatment to almost insoluble in the last stage. A similar affect may be obtained by using a surfactant having short side chains initially and a surfactant having longer side chains in later stages.

For the design of the surfactant flush, preferably laboratory experiments using cores from a formation to be treated may be used. Other porous media may be used that have comparable capacities to adsorb the surfactant to be considered. A solution of a surfactant being considered for use is prepared at a known concentration. A known number of pore volumes of the surfactant being considered may be flowed through the core and the effluent concentration of the surfactant measured using conventional analytical methods. Preferably, this test is performed at the temperature in the reservoir of interest. In this way the ratio of the rate of movement of the surfactant solution at the selected concentration to the rate of movement of the solvent is determined. Then the volume of solution of surfactant to be injected to achieve oil-wetting of the formation to a selected distance from a well can be readily calculated. A mathematical model that takes into account fluid flow and surfactant adsorption may be used, as is well known in the art. If the well has not been hydraulically fractured, the model may consider radial flow around the well. If the well has been hydraulically fractured, the model must consider the formation conditions from the face of the fracture outward, rather than just a radial distance from the wellbore.

By varying the surfactant and/or surfactant blend in different solvents, the laboratory flush tests can be used to select the preferred combination of surfactant or surfactant mixture and solvent. The desired oil-wet state can be determined by oil-imbibition measurements, using known techniques. Alternatively, relative permeability measurements using rock samples that are water-wet and samples previously treated to be made oil-wet by a surfactant flush as disclosed herein may be used.

Preferably, prior to the injection of the surfactant flush, a pre-flush step is performed to reduce the water saturation of the formation in the vicinity of a treated well. The pre-flush step involves the injection of a fluid into the near-wellbore region that miscibly displaces, evaporates, dissolves, or by a combination of these processes, removes the water that is present in the formation. By the removal of liquid water, the pores of the formation are cleared for the later adsorption of the surfactant. Suitable fluids used to displace the condensed water include, but are not limited to, carbon dioxide, methanol and mixtures of carbon dioxide and methanol. Critical in the dehydration step is the injection of sufficient volumes of the dehydrating fluid to achieve the desired displacement of water. As shown in FIG. 1, the dehydration fluid may be injected into the well 10 down tubing 16, through perforations 14, and into the formation 20. Once in the formation 20, the fluid displaces the water that is present within the formation 20. Moreover, while the pre-flush is intended to reduce water saturation, it may also displace liquid hydrocarbons. Fluid injected into the formation during treatment with a surfactant is later produced from the well after the well is placed in production.

After the pre-flush dehydration, the surfactant flush step of the method is performed. In the surfactant flush, a surfactant and/or surfactant blend mixed with a solvent is injected into the near-wellbore region. Preferably, the surfactant is injected into the formation after an initial pre-flush treatment that reduces the water saturation in the formation. However, it is recognized that tenaciously adsorbing surfactants may allow effective dehydration within the formation during production of a well without the need for the dehydrating pre-flush.

As illustrated by FIG. 1, the surfactant flush is injected into the well 10 down tubing 16, through perforations 14, and into the formation 20. As discussed above, the surfactant adsorbs onto the walls of the pore spaces of the formation 20. As a result, an oil-wet condition is created on the surface of the pores of the formation rock that acts to decrease the re-saturation of water. If the presence of water within the formation is reduced, the permeability restrictions of the formation to gas caused by retrograde condensation is accordingly also reduced. Consequently, the effective permeability of the formation to gas is increased. As discussed above, the preferable ionic charge of the preferred surfactant varies based on the specific formation. Moreover, the molecular weight of the surfactant and/or solubility of the surfactant in the solvent is varied to achieve the desired placement of the surfactant at specific distances from the wellbore. Additionally, dependent upon the desired wellbore penetration, the near-wellbore region may be treated with multiple surfactant flushes.

After the surfactant flush(es) is complete, a post-flush with light end hydrocarbons may be performed. As illustrated by FIG. 1, the light end hydrocarbons are injected into the well 10 down tubing 16, through perforations 14, and into the formation 20. The light end hydrocarbon flush acts to displace the surfactant farther into the formation 20. Moreover, while a flush with light end hydrocarbons is preferred, it is not required to change the wettability of the formation. Once the light end hydrocarbon flush is complete the entire well may be shut-in for a time to achieve equilibrium within the near-wellbore region. After equilibrium is reached, the well may be re-opened and production resumed. Because of the method of the invention, production problems due to retrograde condensate formation are decreased. In particular, the adsorption of the surfactant onto the surfaces of the pores of the formation creates an oil-wet state and as a result negates or minimizes the re-saturation of water.

For illustrative purposes, the following example is provided. A sandstone formation contains a large quantity of natural gas and is producing from a depth of 12,000 feet in a reservoir with a gas permeability of 2 millidarcies. The well initially produces at a rate of 5 million cubic feet of gas per day, but after a few months of production the producing rate declines to a non-economically viable rate of 200,000 cubic feet of gas per day. Based on laboratory analysis, there is retrograde condensation within the near-wellbore region due to a pressure decrease near the wellbore to below the dew point pressure of the natural gas. The condensation has effectively reduced the in-situ permeability in the near-wellbore region to less than 0.02 millidarcies. In order to restore the economic viability of the producing well, the following embodiment of the invention is used.

First, cores from the subsurface formation and the fluid within it are obtained. Next, laboratory displacements at reservoir temperature are used to determine the desired composition of the surfactant flush. A mathematical model is used to simulate the injection of various surfactant flushes into the near-wellbore region under reservoir conditions to determine the needed ionic charge, solubility of the solvent mixture, and molecular weight and structure of the surfactant. Because there is a sandstone formation, cationic surfactants may be investigated. Moreover, because it is assumed that the desired penetration of surfactant into the formation from the well is 50 feet, the volume of surfactant flush so the surfactant will remain in the solution to a distance of 50 feet from the wellbore is calculated based on the laboratory tests. As a result of tests, four stages of surfactant flush, each containing 1.0% oil wetting surfactant, are selected. To accomplish uniform dispersion of the cationically charged surfactant, the solubility of the surfactant varies from very high in the initial stage allowing deep penetration of the near-wellbore region to almost insoluble in the last stage. Similarly, the same penetration can be accomplished by utilizing four different molecular weights of surfactant or varying side chains of the surfactant.

After the surfactant flush is selected, the next step is the pre-flush dehydration. A mixture of methanol and carbon dioxide is selected as the dehydration fluid. Moreover, the methanol is saturated with carbon dioxide. In this example, it is desired to remove all water from the near-wellbore region for a distance of 50 feet from the wellbore. Assuming a reservoir porosity of 12.0% and a reservoir height of 25 feet, approximately 4,200 barrels of the dehydration fluid is required. As illustrated by FIG. 1, the dehydration fluid is injected into the well 10 down tubing 16, through perforations 14, and into the formation 20. Once in the formation 20, the fluid displaces the water that is present within formation 20.

When the pre-flush dehydration is complete, the near-wellbore region is next treated with the surfactant flush. Based on the previous selection in order to achieve the desired penetration of the oil wetting surfactant, there are four stages of surfactant flush. As shown by FIG. 1, each stage of surfactant flush is injected into the well 10 down tubing 16, through perforations 14, and into formation 20. Subsequent to the surfactant flush, there is a post-flush with light end hydrocarbons, and the well is then shut-in for a day to achieve equilibrium. After equilibrium is achieved, the well is re-opened and production resumes.

While not restoring the original permeability of 2 millidarcies, the above process increases the effective permeability of the formation to gas and, thus, allows an economic production of over 1 million cubic feet per day.

Although the preferred use of the present invention is to reduce the permeability restriction due to retrograde condensate formation in producing reservoirs, it also can be used in other downhole operations. For example, the method of the present invention can be utilized in combination with hydraulic fracturing treatments to minimize damage due to retrograde condensate formation occurring outward from the face of the hydraulic fractures around a wellbore.

The example above illustrates application of the method disclosed herein to gas wells producing from reservoirs where retrograde condensation occurs. The method may also be applied to oil wells producing under conditions that gas breakout of solution gas occurs in the reservoir rock around the well. The gas saturation, in the presence of water and oil, causes a decrease in oil flow into the well. The steps outlined above may also be applied in such wells, where removal of the water in the rock around a well and treatment with surfactant allows increased oil flow into the well.

The foregoing disclosure and description of the invention are illustrative and explanatory thereof, and various changes in the details of the illustrated method of operation may be made without departing from the spirit of the invention.

What we claim is:

1. A method for increasing the productivity of a well producing from a gas reservoir in a formation in which retrograde condensation occurs near the well, comprising:

(a) injecting a solution of an oil-wetting surfactant in a solvent into the well; and (b) producing the solvent from the well.

2. The method of claim 1 additionally comprising before step (a) the step of injecting a pre-flush liquid to decrease the water saturation in the formation near the well.

3. The method of claim 2 wherein the pre-flush liquid comprises carbon dioxide, alcohol or mixtures thereof.

4. The method of claim 1 wherein the formation is sandstone and the surfactant is cationic.

5. The method of claim 1 wherein the formation is carbonate and the surfactant is anionic.

6. The method of claim 1 further comprising the step of hydraulically fracturing the well before step (a).

7. The method of claim 1 wherein in step (a) the oil-wetting surfactant comprises a plurality of oil-wetting surfactants having a range of molecular weights or a range of solubilities in the solvent or a range of molecular weight and structure of the side chains of the oil-wetting surfactant.

8. The method of claim 7 wherein the plurality of oil-wetting surfactants are injected sequentially.

9. The method of claim 1 further comprising the step of injecting a post-flush liquid after step (a).

10. The method of claim 1 wherein the concentration of the surfactant in the solvent is in the range of 0.05% to 5.0% by volume.

11. The method of claim 1 wherein concentration of the surfactant in the solvent is in the range of 0.1% to 3.0% by volume.

12. The method of claim 1 wherein the concentration of the surfactant in the solvent is in the range of 0.1% to 1.0% by volume.

13. The method of claim 1 wherein the solvent comprises alcohol, water, or mixtures thereof.

* * * * *